United States Patent
Du et al.

(10) Patent No.: US 11,221,875 B2
(45) Date of Patent: Jan. 11, 2022

(54) COOPERATIVE SCHEDULING OF VIRTUAL MACHINES

(71) Applicant: INTEL CORPORATION, Santa Clara, CA (US)

(72) Inventors: Yuyang Du, Beijing (CN); Mingqiu Sun, Beaverton, OR (US); Jian Sun, Singapore (SG); Yong Tong Chua, Singapore (SG)

(73) Assignee: INTEL CORPORATION, Santa Clara, CA (US)

( * ) Notice: Subject to any disclaimer, the term of this patent is extended or adjusted under 35 U.S.C. 154(b) by 90 days.

(21) Appl. No.: 16/079,999

(22) PCT Filed: Mar. 31, 2016

(86) PCT No.: PCT/CN2016/078141
§ 371 (c)(1),
(2) Date: Aug. 25, 2018

(87) PCT Pub. No.: WO2017/166207
PCT Pub. Date: Oct. 5, 2017

(65) Prior Publication Data
US 2019/0065250 A1 Feb. 28, 2019

(51) Int. Cl.
*G06F 9/455* (2018.01)
*G06F 9/48* (2006.01)

(52) U.S. Cl.
CPC ........ *G06F 9/4881* (2013.01); *G06F 9/45558* (2013.01); *G06F 2009/45583* (2013.01);
(Continued)

(58) Field of Classification Search
CPC .............. G06F 9/4881; G06F 9/45558; G06F 2009/45583; G06F 2009/45591; G06F 2209/503
See application file for complete search history.

(56) References Cited

U.S. PATENT DOCUMENTS 6,757,897 B1 * 6/2004 Shi ........................ G06F 9/4843
710/240
2002/0032850 A1 * 3/2002 Kauffman ............. G06F 9/5077
712/31
(Continued)

FOREIGN PATENT DOCUMENTS

| CN | 101667144 A | 3/2010 |
| CN | 102096461 A | 6/2011 |
| WO | 2011163033 A2 | 12/2011 |

OTHER PUBLICATIONS

International Search Report and Written Opinion for International PCT Application Serial No. PCT/CN2016/078141 with a filed date of Mar. 31, 2016 and dated Dec. 29, 2016, 8 pages.
(Continued)

*Primary Examiner* — Diem K Cao
(74) *Attorney, Agent, or Firm* — Hanley, Flight & Zimmerman, LLC (57) ABSTRACT

A method and apparatus for cooperative scheduling of virtual machines. An exemplary method includes maintaining a CPU mask by a virtual machine manager, wherein the CPU mask comprises a real-time availability of each of a plurality of physical CPUs (PCPUs). A virtual machine (VM) is allowed to read the CPU mask.

23 Claims, 8 Drawing Sheets

PCPU Unavailable

PCPU Available

400

(52) U.S. Cl.
CPC .............. *G06F 2009/45591* (2013.01); *G06F 2209/503* (2013.01)

(56) References Cited

U.S. PATENT DOCUMENTS

| | | | |
|---|---|---|---|
| 2007/0112999 A1* | 5/2007 | Oney .................. | G06F 9/45545 711/6 |
| 2010/0138828 A1* | 6/2010 | Hanquez ............. | G06F 9/45558 718/1 |
| 2010/0169885 A1 | 7/2010 | Bogin et al. | |
| 2012/0174097 A1* | 7/2012 | Levin .................... | G06F 9/5077 718/1 |
| 2015/0058861 A1* | 2/2015 | Zheng .................... | H04L 47/56 718/104 |

OTHER PUBLICATIONS

The International Bureau, "International Preliminary Report on Patentability," issued in connection with International Application No. PCT/CN2016/078141, dated Oct. 2, 2018, 5 pages.

\* cited by examiner

COOPERATIVE SCHEDULING OF VIRTUAL MACHINES

CROSS REFERENCE TO RELATED APPLICATIONS

Pursuant to 35 U.S.C. § 371, this application is the United States National Stage Application of International Patent Application No. PCT/CN2016/078141, filed on Mar. 31, 2016, the contents of which are incorporated by reference as if set forth in their entirety herein.

TECHNICAL FIELD

The present techniques relate generally to virtual machines running on multicore processors. More specifically the present techniques relate to scheduling operations of VMs in mobile devices on shared cores.

BACKGROUND

In a virtualized computing environment, a software environment termed a virtual machine (VM) is configured to emulate a physical machine. A physical machine, often referred to as a "host," can be configured to implement multiple virtual machines (VMs) running operating systems that are termed guest operating systems. The physical machine includes system hardware, such as multiple physical processors (PCPUs). In addition, the physical machine includes memory and various other hardware devices, such as local storage and input/output functions.

A VM includes emulated devices, or "virtual" system hardware, that ordinarily includes virtual CPUs (VCPUs), virtual memory, virtual storage, virtual 10, and one or more other virtual devices. A VM typically will include both virtual system hardware and guest system software including virtual drivers used for various virtual devices.

The VMs are often instantiated, provisioned, and controlled by a layer of co-resident software, termed a virtual machine monitor (VMM). The VMM may allocate host machine resources dynamically and transparently among the multiple VMs so that their respective guest operating systems may run one or more VCPUs concurrently on a single physical machine.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Mobile devices have advanced with the development of low power CPUs having multiple cores, giving a mobile device the ability to run multiple virtual machines (VMs) as described herein. The VMs may be instantiated by a virtual machine monitor (VMM), which controls the interaction of the VMs with the physical hardware of the host. Each VM may include one or more virtual CPUs (VCPUs) that may each be assigned to a different processor. In some cases, a VCPU in each of two different VMs may share a physical CPU (PCPU). This may lead to cases of contention, for example, when a shared PCPU running a process for a VCPU in a low priority VM is preempted by a process in a higher priority VM. As each VM is unaware of the other VMs running on the machine, the interruption may not be handled appropriately be the preempted VM, leading to performance and responsiveness issues.

The techniques described herein provide a cooperative scheduling scheme between VMs and VMM. In this scheme, operating systems (OS's) in the VMs, termed guest OS's will be notified of arriving preemption events, which allows a guest OS to quickly react and schedule tasks away to the VCPUs that have dedicated PCPUs without virtualization overhead, resulting in better performance and shorter latency.

Further, VCPU availability information may be shared between the VMM and the VMs, enabling a VM to be configured to favor highly available VCPUs, such as the VCPUs with PCPUs that are not shared with other VMs. The availability information may include current, real-time availability of PCPUs as well as a predicted time that a PCPU will be available, based on historical data. The interface by which the guest OS's cooperate and communicate with the VMM may be based on shared memory locations, simplifying the design.

Figure 1:
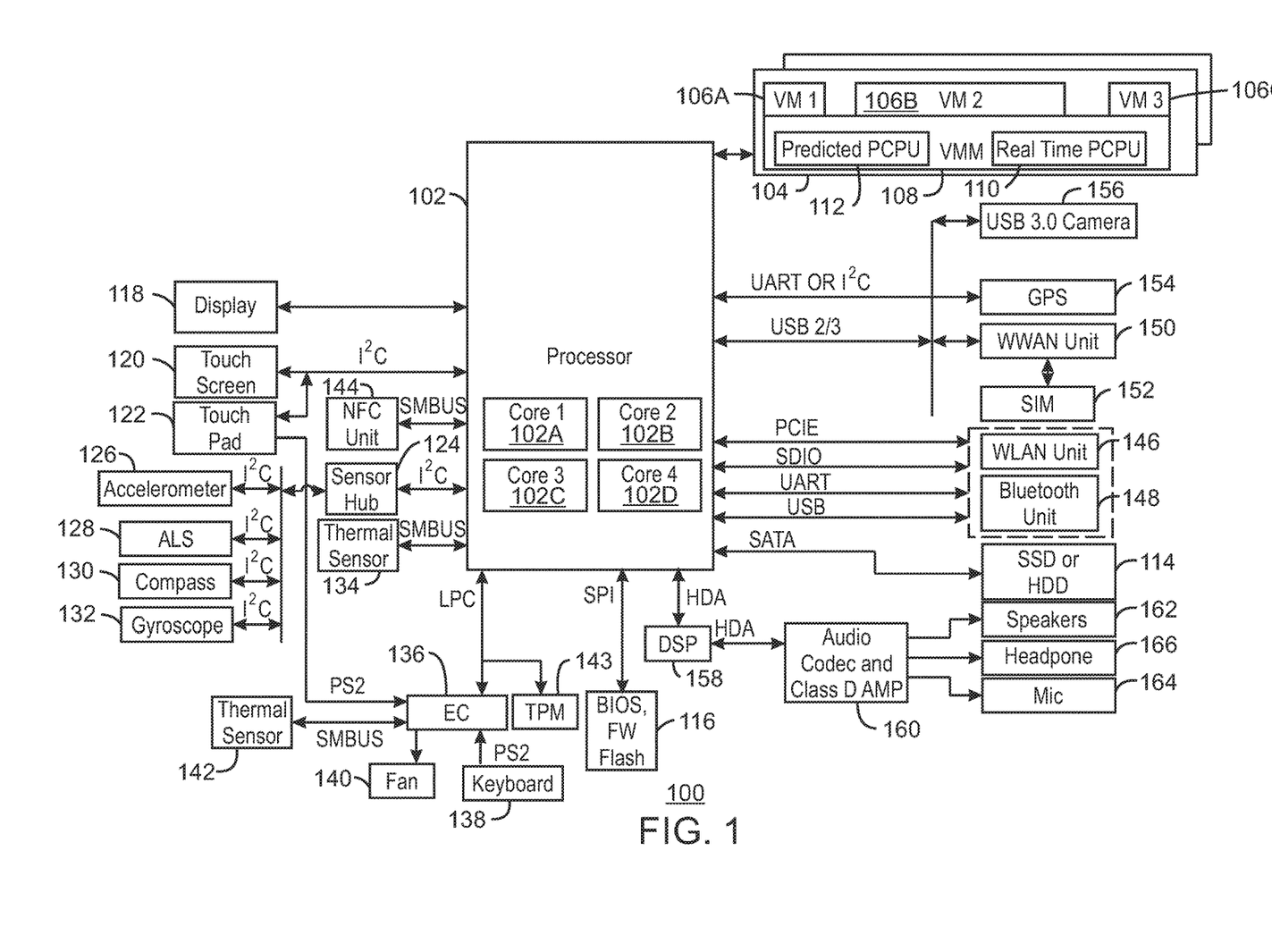
FIG. 1 is a block diagram of components that may be present in an example computing system.

FIG. 1 is a block diagram of components that may be present in an example computing system 100. The example computing system 100 may be include handheld devices, personal computers (PC), computer systems, embedded devices and the like. For example, the computing system 100 may be a cellular phone, a tablet computer, an Internet Protocol device, a digital camera, a personal digital assistant (PDA), or a handheld PC. Embedded devices can include a micro controller, a digital signal processor (DSP), a system on a chip, a network computer (NetPC), a set-top box, a network hub, a wide area network (WAN) switch, or any other system that can use the VM information system described herein.

The components in the computing system 100 may be implemented as integrated circuits (ICs), portions thereof, discrete electronic devices, or other modules, logic, hardware, software, firmware, or a combination thereof adapted in a computer system, or as components otherwise incorporated within a chassis of the computer system. Note also that the block diagram of FIG. 1 is intended to show a high level view of many components of the computer system. However, it is to be understood that some of the components shown may be omitted, additional components may be present, and different arrangement of the components shown may occur in other implementations.

The computing system 100 includes a processor 102, or processor system, that may be a microprocessor, a multicore processor, a multithreaded processor, an ultra-low voltage processor, an embedded processor, or other known processing element. In the illustrated example, processor 102 acts as a main processing unit and central hub for communication with many of the various components of the system 100. In one example, the processor 102 is implemented as a system on a chip (SoC). The processor 102 may be an Intel® Architecture Core™-based processor such as a Quark™, an Atom™, i3, i5, i7 or another such processor available from Intel Corporation, Santa Clara, Calif. However, it may be noted that other low power processors, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may be used. In some examples, the processor may be an Apple A5/A6 processor, a Qualcomm Snapdragon processor, or TI OMAP processor.

In this example, the processor 102 is a multicore processor that includes four cores 102A-102D, termed PCPUs herein. For example, this may be an entry level multicore processor used for mobile devices, such as the Intel Atom X3, among others. In other examples, the processor 102 may have more cores, such as eight cores, or more. The techniques described herein allow operating systems (OS's) in VMs running in the computing system 100 to be configured to respond to the current and predicted loading on the different PCPUs and to allocate tasks based on this information.

The processor 102 communicates with a system memory 104. The system memory 104 may be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. Other memory implementations may be used such as other types of memory modules, e.g., dual inline memory modules (DIMMs) of different varieties including but not limited to microDlMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

As shown in FIG. 1, the system memory 104 may include VMs that operate the device. In this example, three VMs are included, a modem VM 106A, an app VM 106B, and a security VM 106C. In other examples, fewer or more VMs may be present. A VMM 108 instantiates and provisions the VMs 106A-106C, for example, allocating system and memory resources. The VMM 108 may handle some interactions with the hardware of the computing system 100, while others may be directly operated from the VMs 106A-106C.

In one example, the VMM 108 maintains commonly accessible memory areas that allow communication of the status of the PCPUs 102A-102D to operating systems in the VMs 106A-106C. A first memory area 110 may include a real time availability of the PCPUs 102A-102D. A second memory area 112 may include predictions of availability for each of the PCPUs 102A-102D. Other memory areas may be maintained by the VMM 108, such as interrupt timers for tracking allowed preemption times.

To provide for persistent storage of information such as data, applications, one or more operating systems and so forth, a mass storage 114 may also couple to the processor 102. In various embodiments, to enable a thinner and lighter system design as well as to improve system responsiveness, the mass storage may be implemented via a solid state drive (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 1, a flash device 116 may be coupled to processor 102, e.g., via a serial peripheral interface (SPI). This flash device may provide for non-volatile storage of system software, including a basic input/output software (BIOS) as well as other firmware of the system.

Various input/output (IO) devices may be present within the computing system 100. For example, a display 118 may be included, which may be a high definition OLED, LCD, or LED panel mounted in a chassis of the computing device 102. The display 118 may be part of a display panel that includes a touch screen 120, e.g., adapted externally over the display 118, such that user inputs can be provided to the system to enable desired operations, e.g., with regard to the display of information, accessing of information and so forth. In one example, the display 118 may be coupled to the processor 102 via a display interconnect that can be implemented as a high performance graphics interconnect. The touch screen 120 may be coupled to processor 102 via another interconnect, which may be an I$^2$C interconnect. In addition to the touch screen 120, user input may also occur via a touch pad 122 or input buttons which may be configured within the chassis and may also be coupled to the same I$^2$C interconnect as the touch screen 120.

In various embodiments, the display 118 can be of different sizes, e.g., 3-3.9", 4-4.5", 11.6", 13.3" or any number of other sizes, and may have a 16:9 aspect ratio. Further, the display 118 may be high definition (HD) resolution (at least 1920×1080p), be compatible with an embedded display port (eDP), and be a low power panel with panel self-refresh.

The touch screen 120 may be multi-touch capable, for example, a capacitive touch screen 120 enabling two or more simultaneous touch entries. In one example, the touch screen 120 and display 118 are accommodated within a damage and scratch-resistant glass and coating (e.g., Gorilla Glass™ or Gorilla Glass 2™) for low friction to reduce "finger burn" and avoid "finger skipping".

Various sensors may be present within the computing system 100 and may be coupled to processor 102 in different manners. For example, inertial and environmental sensors may couple to processor 102 through a sensor hub 124, e.g., via an I$^2$C interconnect. The sensors may include an accelerometer 126, an ambient light sensor (ALS) 128, a compass 130 and a gyroscope 132. Other environmental sensors may include a thermal sensor 134 that may couple to processor 102 via a system management bus (SMBus) bus.

Various peripheral devices may couple to processor 102, for example, via a low pin count (LPC) interconnect. In the example shown in FIG. 1, components may be coupled through an embedded controller 136. Such components can include a keyboard 138 (e.g., coupled via a PS2 interface), a fan 140, and a thermal sensor 142. In some embodiments, the touch pad 122 may also couple to the EC 136 via a PS2 interface.

A security processor such as a trusted platform module (TPM) 143 in accordance with the Trusted Computing Group (TCG) TPM Specification Version 1.2, dated Oct. 2, 2003, may also couple to processor 102 via this LPC interconnect. In different implementations, a security module such as a TPM can be integrated into a processor or can be a discrete device such as a TPM 2.0 device. With an integrated security module, BIOS/firmware can be enabled to expose certain hardware features for certain security features, such as secure instructions, secure boot, Intel® Trusted Execution Technology (TXT), and Intel® Manageability Engine Technology, among others. The Intel® Manageability Engine Technology may be used to implement the Intel® Platform Trust Technology (PTT), the Intel® Anti-Theft Technology, and the Intel® Identity Protection Technology, among others. Further, the integrated security module may be used to implement secure user interfaces such as a secure keyboard and display.

However, the scope of the present techniques is not limited in this regard and secure processing and storage of secure information may be in another protected location such as a static random access memory (SRAM) in a security coprocessor, or as encrypted data blobs that are only decrypted when protected by a secure enclave (SE) processor mode. In one example described further herein, operation of the security functions may be assigned to a dedicated VM, such as the security VM 106C.

Peripheral ports may be included in the computing system 100, either as individual ports or as a combined port in smaller form factor devices. The peripheral ports may include a high definition media interface (HDMI) connector. Further, USB ports may be included, such as external ports in accordance with the Universal Serial Bus Revision 3.0 Specification (November 2008), for charging of the device. In a larger form factor device, a USB port may be included for charging of other USB devices (such as smartphones) when the system is in Connected Standby state and is plugged into AC wall power. Other ports may include an externally accessible card reader such as an SD-XC card reader and/or a SIM card reader for WWAN identification. For audio, a 3.5 mm jack with stereo sound and microphone capability (e.g., combination functionality) may be present, with support for jack detection (e.g., headphone-only support using a microphone in the device, or a headphone with a microphone in the cable). In some embodiments, the jack can be re-configurable between stereo headphone output and stereo microphone input. Also, a power jack can be provided for coupling to an AC power transformer.

The computing system 100 may communicate with external devices in a variety of manners, including wirelessly. In the example shown in FIG. 1, various wireless modules, each of which can correspond to a radio configured for a particular wireless communication protocol, are present. One type of wireless communication in a short range such as a near field may be via a near field communication (NFC) unit 144 which may communicate with the processor 102 via an SMBus. Note that using the NFC unit 144, devices in close proximity to each other can communicate. For example, a user can enable the computing system 102 to communicate with another portable device such as a smartphone by placing the two devices in close proximity and enabling the transfer of information, such as identification information, payment information, image data, and the like. Wireless power transfer may also be performed using a NFC system.

Additional wireless units that may be present in the computing system 100 include other short range wireless engines, such as a WLAN unit 146 and a Bluetooth unit 148. Using the WLAN unit 146, Wi-Fi™ communications in accordance with a the Institute of Electrical and Electronics Engineers (IEEE) 802.11 standard can be realized, while using the Bluetooth unit 148, short range communications via a Bluetooth protocol can occur. These units may communicate with the processor 102, e.g., through a USB link or a universal asynchronous receiver transmitter (UART) link. The units may be coupled to the processor 102 using an interconnect according to a Peripheral Component Interconnect Express™ (PCIe™) protocol, e.g., in accordance with the PCI Express™ Specification Base Specification version 3.0 (published Jan. 17, 2007). Other protocols, such as a serial data input/output (SDIO) standard, may be used.

In addition, wireless wide area communications, e.g., according to a cellular or other wireless wide area protocol, can occur via a WWAN unit 150 which in turn may couple to a subscriber identity module (SIM) 152. In an example, as described further herein, communications, such as via the WWAN unit 150, the WLAN unit 146, or the Bluetooth unit 148, may be handled by a dedicated VM, such as the modem VM 106A.

The computing system 100 may include a GPS module 154 to enable receipt and use of location information. In the example shown in FIG. 1, the WWAN unit 150, the GPS module 154, and an integrated imaging device, such as a camera module 156 may communicate with the processor 102 via a USB protocol such as a USB 2.0 or 3.0 link, or a UART or I²C protocol. In some examples, the WWAN unit 150 may be an integrated device that can provide support for 3G/4G/LTE and GPS. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

To provide for audio inputs and outputs, an audio processor can be implemented via a digital signal processor (DSP) 158, which may couple to the processor 102 via a high definition audio (HDA) link. Similarly, the DSP 158 may communicate with an integrated amplifier and coder/decoder (CODEC) 160 that may couple to output speakers 162, for example, mounted within the chassis. Similarly, amplifier and CODEC 160 can be coupled to receive audio inputs from a microphone 164. Note also that the audio outputs can be provided from the amplifier/CODEC 160 to a headphone jack 166. Although shown with these particular components in the embodiment of FIG. 1, understand the scope of the present techniques is not limited in this regard.

In one example, the digital audio codec and amplifier 160 is capable of driving the stereo headphone jack, stereo microphone jack, an internal microphone array and stereo speakers. In other examples, the codec can be integrated into an audio DSP or coupled via an HD audio path to a peripheral controller hub (PCH).

Figure 2:
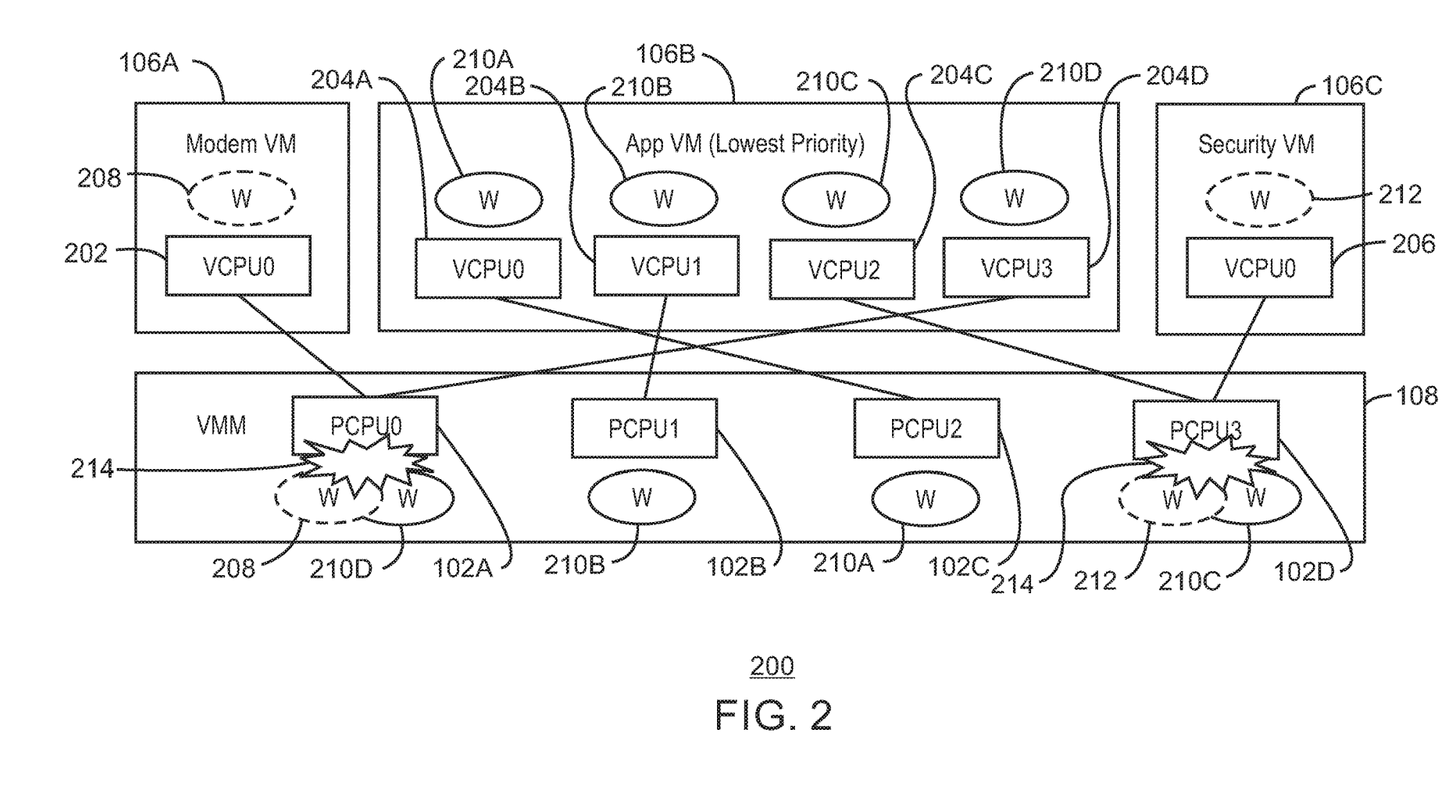
FIG. 2 is a schematic diagram of an example of the operation of a VMM controlling three VMs.

FIG. 2 is a schematic diagram 200 of an example of the operation of a VMM 108 controlling three VMs 106A-106C. Like numbered items are as described with respect to FIG. 1. Each of the VMs 106A-106C has virtual central processing units (VCPUs) 202, 204A-204D, and 206 assigned to PCPUs 102A-102D by the VMM 108. As described with respect to FIG. 1, one VM may be dedicated to communications, e.g., modem VM 106A, and another VM may be dedicated to security functions, e.g., security VM 106C. A third VM, app VM 106B, may be dedicated to running all of the other functions of the device. To decrease virtualization overhead, the VMM 108 may pin the VCPU 202 in the modem VM 106A to a fixed PCPU, e.g., PCPU0 102A. The same function may be performed for the VCPU 206 in the security VM 106C, which may be pinned to PCPU3 102D. Each of the VCPUs 204A-204D in the app VM 106B may also be mapped to a fixed PCPU 102A-102D, where lines between a VCPU 202, 204A-204D, and 206 and a PCPU 102A-102D indicate a static mapping. The workloads 208, 210A-210D, and 212 of each VCPU 202, 204A-204D, and 206 are performed by the respective PCPU 102A-102D to which the VCPU 202, 204A-D, and 206 is mapped.

To meet real-time requirements, the VMM 108 uses a priority-based scheduler for the VCPUs 202, 204A-D, and 206. The modem VM 106A and the security VM 106C correspond to critical functions that may fail if not quickly handled, accordingly, they are given the highest priority. Having lower priority, the VCPUs 204A-204D in the app VM 106B are unconditionally preempted if the modem VM 106A or the security VM 106C is in contention 214 for the same PCPU. If preempted, a victim VCPU may wait until the preempting VM is inactive for an arbitrarily long time, e.g., until a timeout is completed. In some higher speed communications, such as under the LTE protocol, the active time of the modem VM 106A may be as high as 80%, due to the high data rate, which may interfere with the performance of the app VM 106B. As data rates increase in the future generations of modems, this may be more problematic. Although complex VMMs, such as Xen, may allow much more flexibility in VCPU scheduling to decrease this problem, they may add substantial overhead, which will also affect performance.

One approach to addressing this problem is to consolidate workload into dedicated PCPUs, e.g., PCPU 102B or PCPU 102C, without app VM 106B being aware of the allocation. In doing so, however, the reaction time for a VM is constrained by the real-time requirements for modem VM 106A and security VM 106C. This may be accomplished by using a VT-x preemption timer, which guarantees a return to the VMM 108 within a specified timeframe. In addition, based on criticality of the preemption events, the VMM 108 may provide different timeframes for app VM 106B. For example, a GSM frame interrupt must be handled in no more than 500 us. In contrast, a data packet arrival interrupt can have as long as 2 ms.

Further, the operating system of the app VM 106B may access information concerning the operations of the modem VM 106A and the security VM 106C to allow the app VM 106B to adjust the scheduling of workloads. Otherwise, like on a bare metal system, the scheduler of the guest OS in app VM 106B will attempt to evenly spread workload across all the VCPUs 204A-204D. This can make the situation caused by preemption worse, since when the modem VM 106A or the security VM 106C is active, the app VM 106B will usually be active as well, as the applications are communicating data with the modem or requesting services from the security engine.

In examples described herein, two types of information may be shared with the app VM 106B by the VMM 108, including real-time availability of the PCPUs 102A-102D, and the probability that, or anticipated time in which, PCPUs 102A-102D will be taken by other VMs, e.g., the modem VM 106A or the security VM 106C. This can be predicted by the VMM 108 from historical statistics on the loading of the PCPUs 102A-102D. The guest OS in the app VM 106B may use the information to schedule tasks, e.g., assigning workloads to a shared PCPU, such as PCPU 102A or 102D, proportional to the availability of the PCPU 102A or 102D. The information provided by the VMM 108 allows the workloads of the higher-priority VMs 106A and 106C to cooperate with app VM 106B in order to reconcile contention 214 for PCPUs 102A and 102C.

The techniques described herein allow cooperation between the VMs and the VMM. This may avoid the preemption-waiting problem, since the guest OS is informed of an arriving preemption and then can prepare for it, for example, by pausing or shifting workloads. With the shared information about the availability of PCPUs 102A-102D, the app VM 106B can better utilize its VCPUs 204A-204D, avoiding any performance loss. The app VM 106B can best adjust task placements at very low performance and virtualization overhead. Compared to changes to the VMM 108 to implement these functions, the techniques described incur little virtualization overhead, making it more practical for a processor having fewer cores. The cooperative scheduling scheme has three components, arriving preemption notification, sharing information on contention of a PCPU, and CPU availability.

Figure 3A:
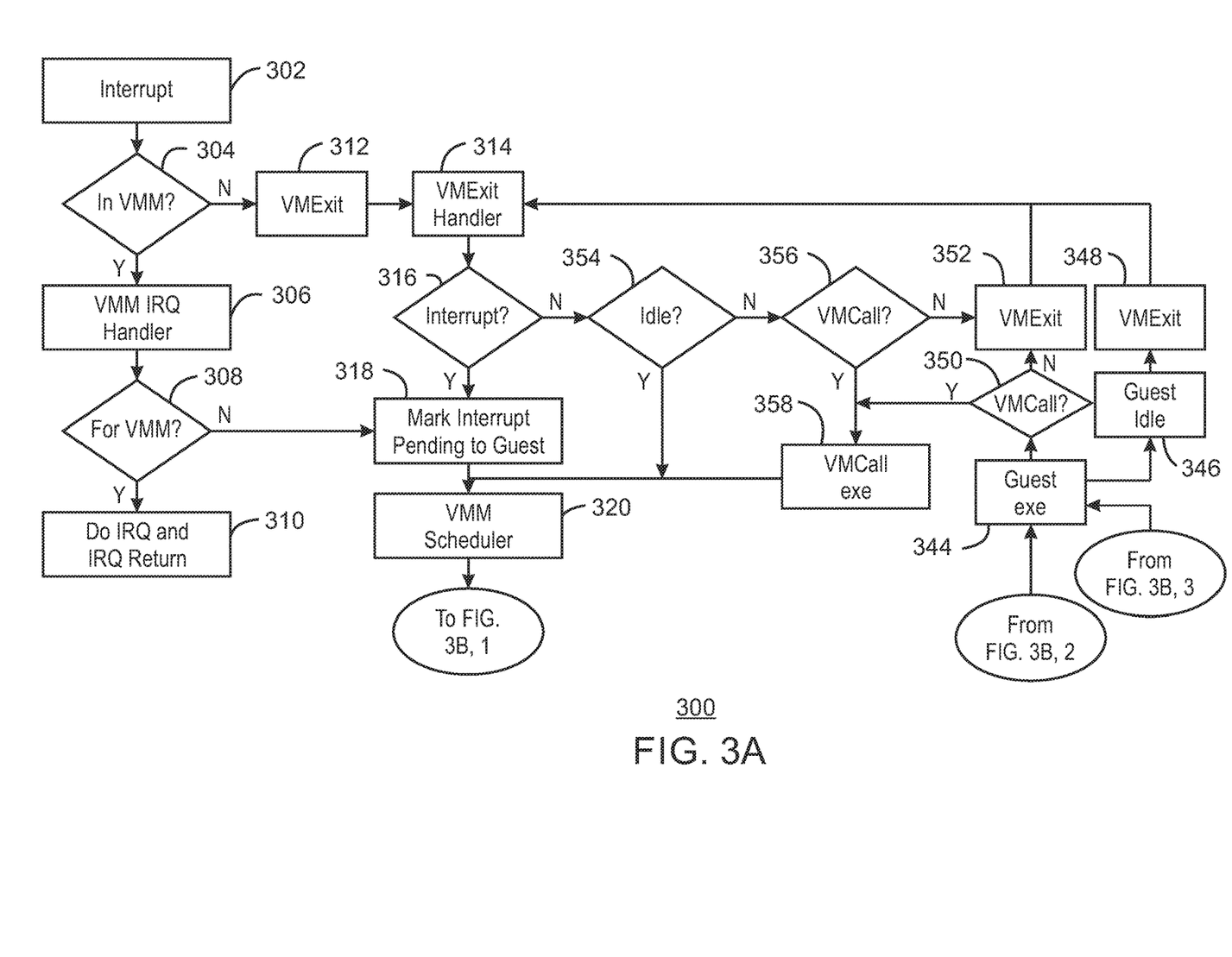
FIGS. 3A and 3B are process flow diagrams of a method for handling arriving preemption notifications.
Figure 3B:
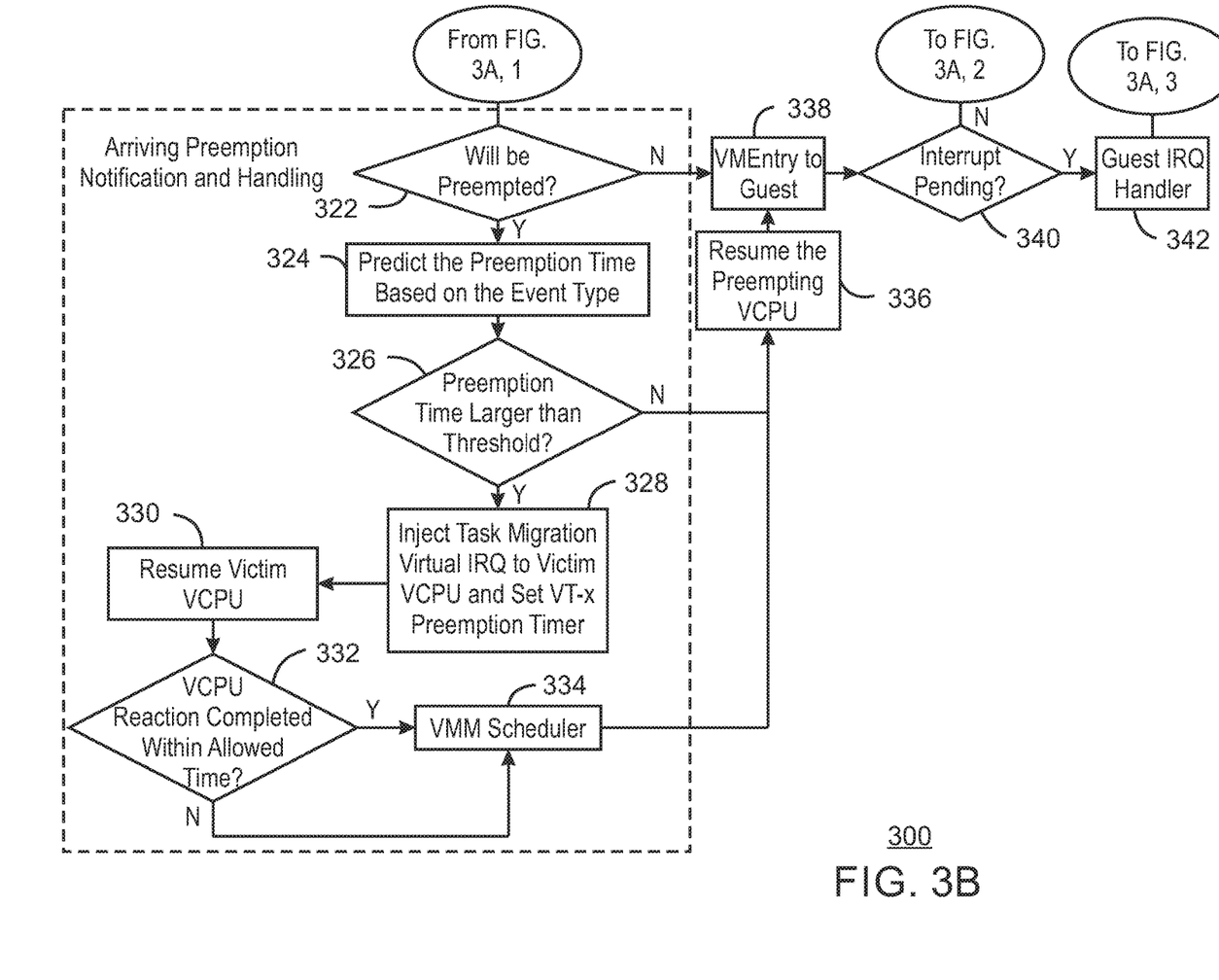

FIGS. 3A and 3B are process flow diagrams of a method 300 for handling arriving preemption notifications. The preemption takes the form of an interrupt request (IRQ) received at block 302. A determination is made at block 304 that the interrupt is triggered while the VMM is running, at block 306 the interrupt is provided to the VMM interrupt request handler. If, at block 308, the VMM IRQ handler determines that the IRQ is for the VMM, at block 310, the VMM IRQ is handled and the method ends as process flow returns to normal operations.

If, at block 304 it is determined that the IRQ is received, when the guest VM is executing, process flow proceeds to block 312 to exit the VM currently running on the PCPU. At block 314 a VM exit handler is called to check the VM exit reason and handle each one differently. As described, if a higher priority process needs the PCPU, the running VCPU will be interrupted and the VMM will take control of the PCPU.

If at block 316, the VM confirms that it has received an interrupt, at block 318, the interrupt is marked as pending to the guest OS. At block 320, the VMM scheduler is called to determine the timing of the interrupt.

If, at block 322, the VMM affirms that the interrupted VCPU will be preempted by a VCPU from a higher priority VM, at block 324, the VMM will predict a preempted timeframe based on the event type. If, at block 326, it is determined if the preemption time is larger than a predetermined threshold, e.g., that the lower priority processor will need to complete a task, at block 328 the VMM will send a virtual interrupt to the VCPU to be preempted. In handling the interrupt, the VCPU can prepare for the preemption, such as moving tasks to or from other VCPUs. It is critical that the guest OS reaction time is strictly constrained, so the preemption can still happen quickly to meet real-time requirements of the high priority VMs. This is accomplished by a VT-x preemption timer, which guarantees a return to the VMM within a specified timeframe. At block 330, the process on the VCPU in the lower priority VM is resumed. At block 332, a determination is made as to whether the process has completed in the allowed time. If so, process flow proceeds to block 334 to call the VMM scheduler. If not, at block 322, the VT-x preemption timer expires, and the process is interrupted to return to the VMM scheduler at block 334.

If, at block 326, the VMM scheduler determines that the preemption time is smaller than the predetermined threshold, or once the VMM scheduler is called at block 334, the process from the preempting VCPU is resumed at block 336. Once the preempting process is complete, or if it is determined that the process on the lower priority VM will not be preempted at block 322, at block 338 a call is made to reenter the guest OS.

At block 340, a determination is made as to whether an interrupt is pending for the guest OS. If so, at block 342, a call is made to the guest IRQ handler. At block 344, the guest process is run. Once the guest process is finished, at block 346 the VCPU issues an HLT command to indicate the guest OS is idle. At block 348 the HLT command triggers the VMExit to indicate to the VMM that the PCPU is idle. Process flow returns to the VM exit handler at block 314.

If at block 340, it is determined that no interrupt is pending for the guest OS, at block 344 any remaining processes are finished. At block 350, a determination is made as to whether a VM call is present. If not, at block 352, a VM exit occurs, and process flow returns to block 314.

If, at block 316, it is determined that no interrupt is present, at block 354, a determination is made as to whether the VCPU is idle. If not, at block 356 a determination is made as to whether a VM call is present. If so, or if a VMCall is determined to be present at block 350, at block 358 the process for the VM call is executed. Once the process is completed, or if the VCPU in the low priority VM was idle at block 354, process flow then proceeds to block 320 at which the VMM scheduler is called. If at block 356, a VM call is determined to be present, process flow proceeds to block 352.

The techniques described herein further allow the VMM to share two types of information with the low-priority VM about the competition for PCPUs from high-priority VMs. With that information, the OS scheduler in the low-priority VM can be configured to avoid using the VCPUs that are likely to be preempted.

Figure 4:
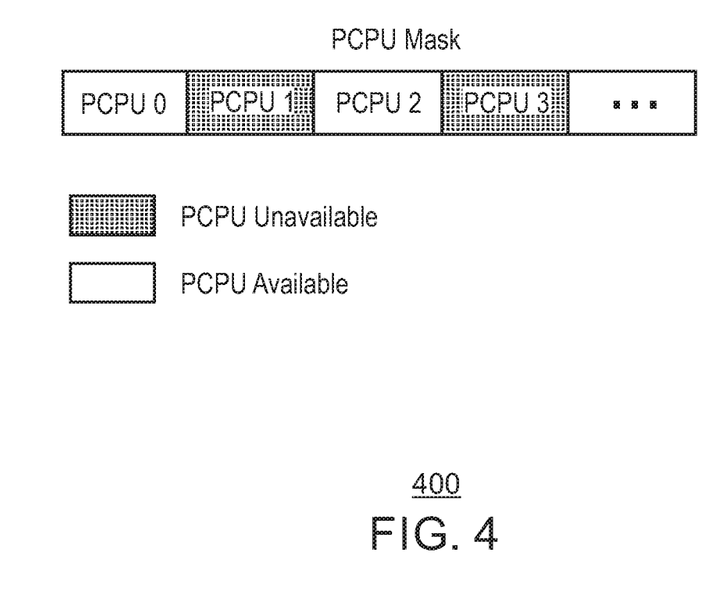
FIG. 4 is a schematic of a PCPU mask showing real time availability of PCPUs in the system.

FIG. 4 is a schematic of a PCPU mask 400 showing real time availability of PCPUs in the system. The PCPU mask may be a memory location or register in which individual bits represent the availability of a corresponding PCPU. For example, a bit value of one, represented by shading in FIG. 4, may indicate that a PCPU is currently taken. Similarly, a bit value of zero, represented by unshaded blocks in FIG. 4, may represent a PCPU that is available.

The VMM may update the mask in real time. The guest OS, for example, in the app VM, has read-only access to the PCPU mask, and it may query the PCPU availability data when making scheduling decisions. This may lead to a workload being assigned to a VCPU that is using to a currently available PCPU, rather than waiting on another PCPU to become available.

The PCPU mask shown in FIG. 4 is not limited to four processors, but may be used with processors having more or less cores, or with multiple processors. Further, the PCPU mask may use a bit value of "0" to indicate an available PCPU and a bit value of "1" to indicate an unavailable PCPU. Any number of other flags, values, or variable systems, may be used in place of bit values in a register.

Figure 5:
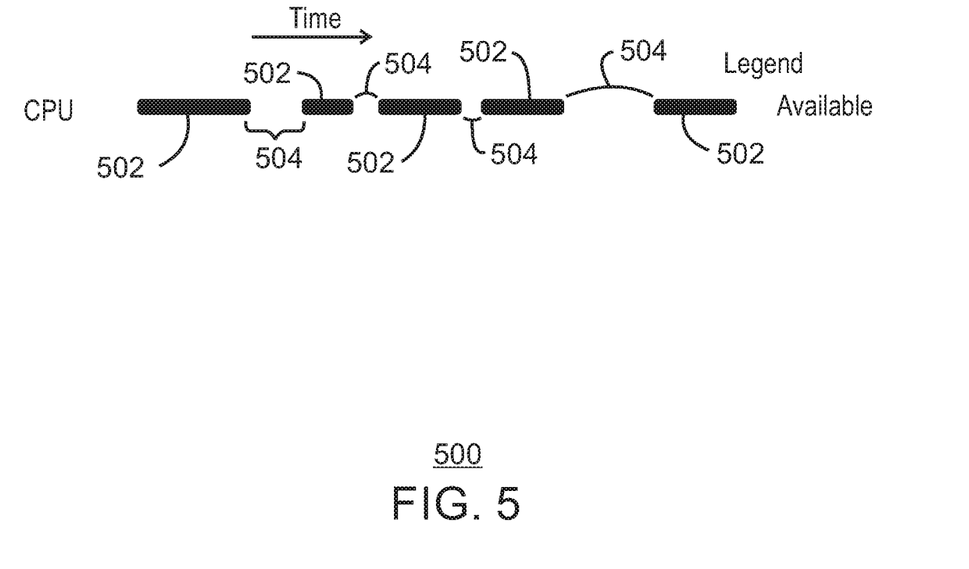
FIG. 5 is a schematic example of a technique for predicting the future availability of PCPUs.

FIG. 5 is a schematic example 500 of a technique for predicting the future availability of PCPUs. The future availability may take the form of predicted period of time during which a PCPU may be available before it is preempted by a higher priority VM. The future availability may also take the form of a probability that a VM will be available. This may allow a guest OS in a lower priority VM, such as app VM, to schedule the assignment of tasks to VCPUs based on the availability of the underlying PCPU.

This information is useful because the real-time availability of the PCPUs, discussed with respect to FIG. 4, may change very rapidly. For example, a VM may query the PCPU mask to determine that a PCPU is available, but find that the PCPU is being utilized by a higher priority VM before a workload can be assigned to the VCPU using that PCPU. Accordingly, the VMM may predict the availability of each PCPU based on the past record of that PCPU. This prediction is calculated as follows.

As each PCPU transitions between a series of available states 502 and unavailable states 504, time intervals, t, that the PCPU is available in real-time, e.g., the PCPU is not taken by other higher-priority VMs, are counted. An average of the times that the PCPU is available during an interval is calculated as T:

$$a = \frac{\sum_{i=1}^{n} t_i}{T}$$

Thus, as time elapses, a series of the averages in the past is collected as $a_1, a_2, a_3, \ldots a_{n-1}, a_n$. After that, the averages may be exponentially decayed after each period, using a decay factor, such that the older the period is, the less impact on the final result. All of the past decayed averages may be summed to get a weighted arithmetic mean of the PCPU available time based on the entire historical records:

$$A = \frac{1}{C} \sum_{j=1}^{n} f^{n-j} * a_j$$

Where the term $a_j$ is the average availability in the $j^{th}$ period, and f is the decay factor. The term C is a constant number to scale A to the same range as the real-time value, for example:

$$C = \lim_{n \to \infty} \sum_{j=1}^{n} f^{m-j}$$

The sum, A, is used as the predicted availability for the CPU. The prediction for all of the pertinent VCPUs for the VM is shared by the VMM, for example, through an accessible storage location, with the VM's guest OS as an array for the guest OS to query. The information described with respect to FIGS. 4 and 5 can be provided to the guest OS, for example, in app VM, to make scheduling decisions for workloads.

Figure 6:
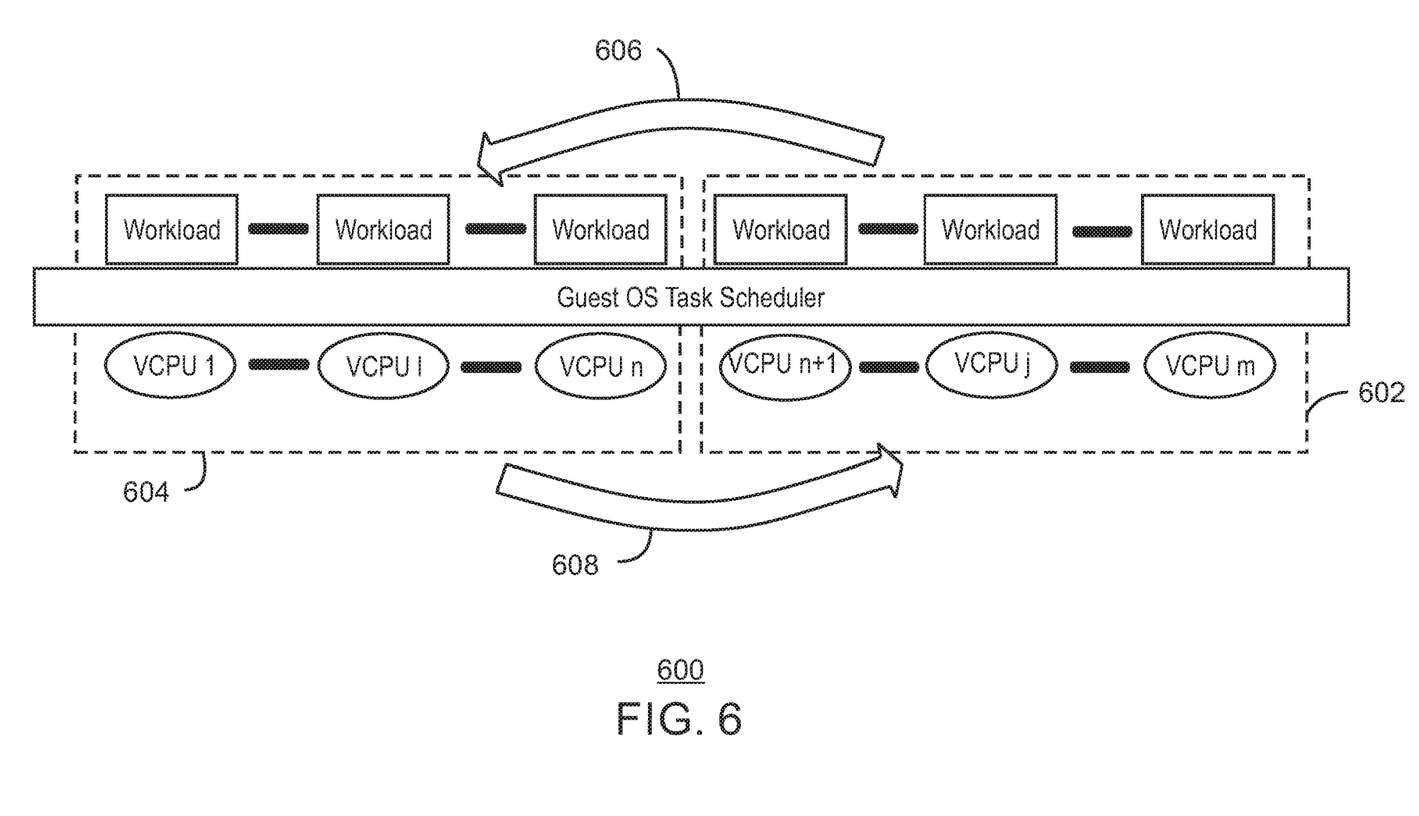
FIG. 6 is a schematic example of folding tasks between VMs depending on loading predictions.

FIG. 6 is a schematic example 600 of folding tasks between VMs depending on loading predictions. Using the PCPU mask that identifies PCPUs currently taken by high-priority VMs, and the predictions of the availability of the PCPUs, the guest OS in a lower priority VM can adjusting workloads between VCPUs corresponding to the PCPUs. The basic policy is to use the PCPU with the highest predicted availability, when possible. In other words, instead of fairly balancing the tasks among the VCPUs, the scheduler should favor the VCPU that corresponds to a currently available or more possibly available PCPU. While the specifics of the implementation may be operating system dependent, the basic operations, however, are the same across operating systems. Based on the information for current and predicted available, as may be read from a shared memory location, the scheduler may push a task from a VCPU 602 that corresponds to a PCPU that is likely to be unavailable to a VCPU 604 that corresponds to a PCPU that is likely to be available, as indicated by arrow 606. The shifting of a task indicated by arrow 606, may also occur when a VCPU 604 pulls a task from a VCPU 602 that corresponds to a PCPU that is likely to be unavailable. This is often termed work-stealing.

By pulling or pushing one task at a time, workloads may gradually be folded to VCPUs that correspond to highly available PCPUs. Similarly, when the workloads becomes high, the guest OS can also spread the tasks in the opposite direction, as indicated by arrow 608.

Figure 7:
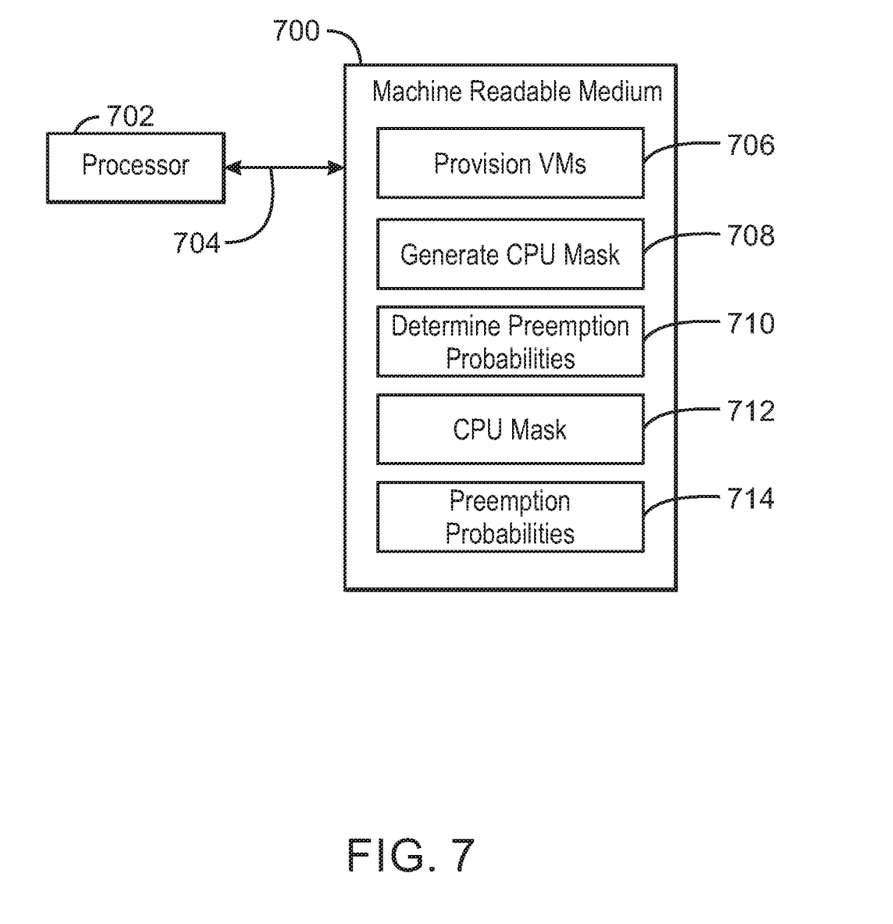
FIG. 7 is a block diagram of a non-transitory machine readable medium including code for directing one or more processors to cooperatively schedule tasks between guest operating systems and a VMM to avoid contention.

FIG. 7 is a block diagram of a non-transitory machine readable medium 700 including code for directing one or more processors 702 to cooperatively schedule tasks between guest operating systems and a VMM to avoid contention. The one or more processors 702 may access the non-transitory computer readable medium 700 over a computer bus 704. The computer bus 704 may be a proprietary bus used in a mobile device, such as a bus included on a system on a chip (SoC), or may include any number of other bus types such as PCI, PCIe, high speed point to point interconnects, and the like.

The non-transitory machine readable medium 700 may include code 706 to direct one or more processors 702 to provision a VM. Further, code 708 may be included to direct the one or more processors 702 to generate a CPU mask 710 that indicates the availability of PCPUs, such as processing cores in the one or more processors 702. Code 712 may be included to direct the one or more processors 702 to calculate predicted times 714 that particular PCPUs will be become unavailable, for example, after being preempted by a higher priority VM.

EXAMPLES

Example 1 includes an apparatus including a processor system. The processor system includes a plurality of physical processors (PCPUs). The apparatus includes a plurality of virtual machines (VMs), each including at least one virtual central processing unit (VCPU). The apparatus includes a virtual machine monitor (VMM) including a shared memory location accessible by the plurality of VMs, wherein the shared memory location includes a CPU mask that indicates a real-time availability of a PCPU, and an array that indicates a predicted time that the PCPU will be available.

Example 2 includes the subject matter of example 1. In this example, each VCPU in the plurality of VMs is mapped to an individual PCPU.

Example 3 includes the subject matter of any of examples 1 to 2. In this example, the VMM includes a predicter that determines the predicted time that a PCPU will become unavailable.

Example 4 includes the subject matter of example 3. In this example, the predicted time is based, at least in part, on historic statistic recorded for PCPU usage.

Example 5 includes the subject matter of example 3. In this example, the predicted time is based, at least in part, on an event type.

Example 6 includes the subject matter of any of examples 1 to 5. In this example, an operating system in a VM is to dynamically adjust task allocation according to the predicted time for each of the plurality of PCPUs.

Example 7 includes the subject matter of any of examples 1 to 6. In this example, the VM is to consolidate tasks to decrease contention for a PCPU.

Example 8 includes the subject matter of any of examples 1 to 7. In this example, the apparatus includes a modem VM including a VCPU assigned to a dedicated PCPU.

Example 9 includes the subject matter of any of examples 1 to 9. In this example, the apparatus includes a security VM including a VCPU assigned to a dedicated PCPU.

Example 10 includes the subject matter of any of examples 1 to 10. In this example, the apparatus includes an app VM including a plurality of VCPUs, wherein one VCPU shares a PCPU with a modem VM, and another VCPU shares a PCPU with a security VM.

Example 11 includes a computing system. The computing system includes a processor system that includes a plurality of physical processors (PCPUs). The computing system includes a plurality of virtual machines (VMs), each including at least one virtual central processing unit (VCPU). The computing system includes a virtual machine monitor (VMM) including a memory location that is accessible by the plurality of VMs. The memory location includes a CPU mask that indicates a real-time availability of individual PCPUs.

Example 12 includes the subject matter of example 11. In this example, each VCPU in the plurality of VMs is mapped to a PCPU.

Example 13 includes the subject matter of either of examples 11 or 12. In this example, the VMM includes a predicter that determines a predicted time that a PCPU will be available before preemption by a high priority VM. The VMM includes a shared memory location to store the predicted time for access a VM in the plurality of VMs.

Example 14 includes the subject matter of either of any of examples 11 to 13. In this example, the predicted time is based, at least in part, on historic statistics recorded for PCPU usage.

Example 15 includes the subject matter of any of examples 11 to 14. In this example, the predicted time is based, at least in part, on an event type.

Example 16 includes the subject matter of any of examples 11 to 15. In this example, a guest operating system in a VM is to dynamically adjust task allocation according to the predicted time.

Example 17 includes a method for cooperative scheduling of virtual machines. The method includes maintaining a CPU mask by a virtual machine manager, wherein the CPU mask includes a real-time availability of each of a plurality of physical CPUs (PCPUs). A virtual machine (VM) is allowed to read the CPU mask.

Example 18 includes the subject matter of example 17. In this example, scheduling tasks in the VM is based, at least in part, on the CPU mask.

Example 19 includes the subject matter of either of examples 17 or 18. In this example, the method includes collecting data on the availability of each of the PCPUs in the plurality of PCPUs during each of a plurality of time periods, and generating an array that includes a predicted time that each of the PCPUs will remain available before being preempted by a high priority VM.

Example 20 includes the subject matter of any of examples 17 to 19. In this example, the method includes starting a preemption timer in a VMM, allowing a VCPU in the low priority VM to use a PCPU, and interrupting the VCPU in the low priority VM when the preemption timer expires.

Example 21 includes the subject matter of any of examples 17 to 20. In this example, a task is transferred from a first VCPU, which corresponds to a PCPU that is predicted to have a low predicted time, to a second VCPU, which corresponds to a PCPU that is predicted to have a high predicted time.

Example 22 includes the subject matter of any of examples 17 to 21. In this example, the task is pulled from the first VCPU to the second VCPU.

Example 23 includes the subject matter of any of examples 21 to 23. In this example, the task is pushed from the first VCPU to the second VCPU.

Example 24 includes a non-transitory machine-readable medium including instructions, which when executed by one or more processors, cause the one or more processors to perform any one of the methods of examples 17 to 23.

Example 25 includes an apparatus including means for performing any one of the methods of examples 17 to 23.

Example 26 includes a non-transitory machine-readable medium, including instructions that when executed by one or more processors, cause the one or more processors to generate a CPU mask, wherein the CPU mask includes a real-time availability of each of a plurality of physical CPUs (PCPUs).

Example 27 includes the subject matter example 26. In this example, the non-transitory machine-readable medium includes instructions that, when executed by one or more processors, cause the one or more processors to predict a time that a PCPU will be available before it is preempted by a high priority process.

Example 28 includes a mobile computing device. The mobile computing device includes a processor that includes a plurality of processor cores, a wireless wide area network (WWAN) unit, and a security system including a trusted platform module (TPM). The mobile computing device also includes a plurality of virtual machines (VMs). The plurality of VMs include a modem VM to control communications through the WWAN unit, wherein the modem VM is operated with a high priority. The plurality of VMs also includes a security VM to control security operations through the security system wherein the security VM is operated with a high priority. The plurality of VMs also includes an app VM to execute applications, wherein the app VM is operated with a low priority. A virtual machine manager (VMM) is included in the mobile computing device, wherein the VMM includes a memory location that includes a CPU mask, wherein the CPU mask includes an indication of real-time availability for each of the plurality of processor cores. The VMM also includes an array that includes predicted times that each of the plurality of processor cores will remain available.

Example 29 includes the subject matter of example 28. In this example, a security setting is included that allows a VM in the plurality of VMs to have read access to the CPU mask and the array.

Example 30 includes an apparatus including a processor system that includes a plurality of physical processors (PCPUs). The apparatus also includes a plurality of virtual machines (VMs), each including at least one virtual central processing unit (VCPU). The apparatus includes a virtual machine monitor (VMM) including a shared memory location. The shared memory location is accessible by the plurality of VMs, and the shared memory location includes a CPU mask that indicates a real-time availability of a PCPU and an array that indicates a predicted time that the PCPU will be available.

Example 31 includes the subject matter of example 30. In this example, each VCPU in the plurality of VMs is mapped to an individual PCPU.

Example 32 includes the subject matter of either of examples 30 or 31. In this example, the VMM includes a predicter that determines the predicted time that a PCPU will become unavailable.

Example 33 includes the subject matter of any of examples 30 to 32. In this example, the predicted time is based, at least in part, on historic statistic recorded for PCPU usage.

Example 34 includes the subject matter of any of examples 30 to 33. In this example, the predicted time is based, at least in part, on an event type.

Example 35 includes the subject matter of any of examples 30 to 34. In this example, an operating system in a VM is to dynamically adjust task allocation according to the predicted time for each of the plurality of PCPUs.

Example 36 includes the subject matter of any of examples 30 to 35. In this example, the VM is to consolidate tasks to decrease contention for a PCPU.

Example 37 includes the subject matter of any of examples 30 to 36. In this example, including a modem VM including a VCPU assigned to a dedicated PCPU.

Example 38 includes the subject matter of any of examples 30 to 37. In this example, including a security VM including a VCPU assigned to a dedicated PCPU.

Example 39 includes the subject matter of any of examples 30 to 38. In this example, including an app VM including a plurality of VCPUs, wherein one VCPU shares a PCPU with a modem VM, and another VCPU shares a PCPU with a security VM.

Example 40 includes an apparatus. The apparatus includes a processor system that includes a plurality of physical processors (PCPUs). The apparatus also includes a plurality of virtual machines (VMs), each including at least one virtual central processing unit (VCPU). A virtual machine monitor (VMM) includes a means for sharing a real-time availability of a PCPU in the plurality of PCPUs with the plurality of VMs.

Example 41 includes the subject matter of example 40. In this example, including a means for determining a predicted time that the PCPU will be available.

Example 42 includes the subject matter of either of examples 40 to 41. In this example, a means for sharing the predicted time with the plurality of VMs is included.

Example 43 includes the subject matter of any of examples 40 to 42. In this example, a means for adjusting adjust task allocation according to the predicted time is included.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus comprising:
a plurality of physical central processing units (PCPUs);
a virtual machine monitor (VMM) including a shared memory location, the shared memory location including:
    a CPU mask that indicates real-time availabilities of ones of the PCPUs, the VMM to allocate system and memory resources and configure a virtual machine (VM) to execute via an available one of the PCPUs;
    data collected on availabilities of the ones of the PCPUs during ones of a plurality of time periods; and
    a generated array that includes predicted times of future availabilities that the ones of the PCPUs will remain available before being preempted by a high priority VM, the VM to schedule a task based on at least one of the real-time availabilities or the future availabilities.

2. The apparatus of claim 1, wherein the VM includes at least one virtual central processing unit (VCPU) mapped to one of the PCPUs.

3. The apparatus of claim 1, wherein the VMM includes a predictor that determines times of future unavailability of the ones of the PCPUs.

4. The apparatus of claim 1, wherein the availabilities are based, at least in part, on historic statistics recorded for usage of ones of the PCPUs.

5. The apparatus of claim 1, wherein the availabilities are based, at least in part, on an event type.

6. The apparatus of claim 1, including an operating system in the VM to dynamically adjust task allocation according to the availabilities of the ones of the PCPUs.

7. The apparatus of claim 1, wherein the VM is to consolidate tasks to decrease contention for the ones of the PCPUs.

8. The apparatus of claim 1, including a modem VM, the modem VM including a virtual central processing unit (VCPU) assigned to dedicated ones of the PCPUs.

9. The apparatus of claim 1, including a security VM, the security VM including a VCPU assigned to dedicated ones of the PCPUs.

10. The apparatus of claim 1, including an app VM, the app VM including a plurality of virtual central processing units (VCPUs), at least a first one of the VCPUs to share at least a first one of the PCPUs with a modem VM, and at least a second one of the VCPUs to share at least a second one of the PCPUs with a security VM.

11. A method for cooperative scheduling of virtual machines, the method comprising:
maintaining a CPU mask by a virtual machine manager (VMM), the CPU mask to indicate real-time availabilities of ones of a plurality of physical central processing units (PCPUs), the VMM to allocate system and memory resources and configure a virtual machine (VM) to execute via an available one of the PCPUs;
allowing the VM to read the CPU mask;
collecting data on availabilities of the ones of the PCPUs during ones of a plurality of time periods; and
generating an array that includes predicted times that the ones of the PCPUs will remain available before being preempted by a high priority VM.

12. The method of claim 11, including scheduling tasks in the VM based, at least in part, on the CPU mask.

13. The method of claim 11, including:
starting a preemption timer in the VMM;
allowing a virtual central processing unit (VCPU) in a low priority VM to use at least one of the PCPUs; and
interrupting the VCPU in the low priority VM when the preemption timer expires.

14. The method of claim 11, including transferring a task from a first virtual central processing unit (VCPU) that corresponds to a first one of the PCPUs that is predicted to have a low predicted time of availability to a second VCPU that corresponds to a second one of the PCPUs that is predicted to have a high predicted time of availability.

15. The method of claim 14, including pulling the task from the first VCPU to the second VCPU.

16. The method of claim 14, including pushing the task from the first VCPU to the second VCPU.

17. A non-transitory machine-readable medium including instructions, which when executed by one or more processors, cause the one or more processors to:

generate a CPU mask maintained by a virtual machine monitor (VMM), wherein the CPU mask is to include a real-time availability of ones of a plurality of physical CPUs (PCPUs), wherein a virtual machine (VM) is configured to execute via an available one of the PCPUs;

allow the VM to read the CPU mask;

collect data on availabilities of the ones of the PCPUs during ones of a plurality of time periods; and generate an array that includes predicted times that the ones of the PCPUs will remain available before being preempted by a high priority VM.

18. The non-transitory machine-readable medium of claim 17, wherein the instructions, when executed by the one or more processors, cause the one or more processors to predict a time that one of the PCPUs will be available before it is preempted by a high priority process.

19. A computing device comprising:

a processor system that includes a plurality of physical central processing units (PCPUs);

a plurality of virtual machines (VMs), ones of the plurality of VMs including at least one virtual central processing unit (VCPU); and a virtual machine monitor (VMM) including a memory location that is accessible by the plurality of VMs, the memory location to include a CPU mask that indicates a real-time availability of ones of the PCPUs, the VMM to allocate system and memory resources and configure a VM to execute via an available one of the PCPUs, wherein the VMM includes a predicter that determines a predicted time that one of the PCPUs will be available before preemption by a high priority VM, and the VMM includes a shared memory location to store the predicted time for access by at least one of the plurality of VMs.

20. The computing device of claim 19, wherein the at least one VCPU in the ones of the plurality of VMs is mapped to one of the PCPUs.

21. The computing device of claim 19, wherein the predicted time is based, at least in part, on historic statistics recorded for usage of the one of the PCPUs.

22. The computing device of claim 19, wherein the predicted time is based, at least in part, on an event type.

23. The computing device of claim 19, wherein a guest operating system in one of the plurality of VMs is to dynamically adjust task allocation according to the predicted time.

* * * * *